US010339612B2

(12) United States Patent
Merhav et al.

(10) Patent No.: US 10,339,612 B2
(45) Date of Patent: Jul. 2, 2019

(54) MULTI-DIMENSIONAL JOB TITLE LOGICAL MODELS FOR SOCIAL NETWORK MEMBERS

(71) Applicant: Microsoft Technology Licensing, LLC, Redmond, WA (US)

(72) Inventors: Uri Merhav, Rehovot (IL); Peide Zhong, Milpitas, CA (US); Angela Jiang, San Francisco, CA (US); Qi He, San Jose, CA (US); Dan Shacham, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 299 days.

(21) Appl. No.: 15/195,562

(22) Filed: Jun. 28, 2016

(65) Prior Publication Data

US 2017/0371957 A1 Dec. 28, 2017

(51) Int. Cl.
*G06F 17/30* (2006.01)
*G06Q 50/00* (2012.01)

(52) U.S. Cl.
CPC .................................... *G06Q 50/01* (2013.01)

(58) Field of Classification Search
CPC ..................................................... G06F 17/277
See application file for complete search history.

(56) References Cited

U.S. PATENT DOCUMENTS

| | | | | |
|---|---|---|---|---|
| 2005/0080657 A1* | 4/2005 | Crow | G06Q 10/06311 705/7.14 |
| 2014/0025686 A1* | 1/2014 | Wong | G06Q 10/10 707/748 |
| 2015/0032744 A1* | 1/2015 | Roulliere | G06F 17/30053 707/736 |
| 2017/0316361 A1* | 11/2017 | Jagota | G06Q 10/06313 |

* cited by examiner

*Primary Examiner* — Hung Q Pham
(74) *Attorney, Agent, or Firm* — Schwegman Lundberg & Woessner, P.A.

(57) ABSTRACT

An online social networking system extracts terms from an unstructured job title record. The system searches a job role taxonomy database with the extracted terms to identify job roles. For each job role identified, the system extracts a plurality of additional terms appearing in the unstructured job title record. For each additional term, the system maps the additional term to a standardized modifier, thereby identifying a job seniority modifier, a job specialty modifier, a job accreditation modifier, and a job status modifier for each additional term. The system creates a multi-dimensional standardized job title for the member profile or job posting by writing the job role, the job seniority modifier, the job specialty modifier, the job accreditation modifier, and the job status modifier to a standardization record in a standardization database.

20 Claims, 6 Drawing Sheets

MULTI-DIMENSIONAL JOB TITLE LOGICAL MODELS FOR SOCIAL NETWORK MEMBERS

TECHNICAL FIELD

The present disclosure generally relates to the technical field of online social networking services, and in an embodiment, but not by way of limitation, to multi-dimensional job title logical models for online social network members.

BACKGROUND

Online social networks provide its members the ability to connect and communicate with other members. Online social networks include a personal profile for each member, which includes the educational history, work history, and personal interests of the member. Many online social networks also include a job posting functionality, wherein employers can post available jobs and potential employees can search through the posted job openings. As with job advertisements prior to the creation of online social networks, such posted available jobs include information such as the employer name, the job title, required work experience, required educational level, and starting salary.

DESCRIPTION OF THE DRAWINGS

Some embodiments are illustrated by way of example and not limitation in the accompanying drawings, in which.

DETAILED DESCRIPTION

In the following description, for purposes of explanation, numerous specific details are set forth in order to provide a thorough understanding of the various aspects of different embodiments of the present invention. It will be evident, however, to one skilled in the art that the present invention may be practiced without all of the specific details and/or with variations, permutations, and combinations of the various features and elements described herein.

The present disclosure describes methods, systems, and computer program products for creating a multi-dimensional job title logical model in an online social networking system. More specifically, the methods, systems, and computer program products receive an unstructured job title record from a member profile or a job posting in the social networking system, and extract terms from the unstructured job title record. The system searches a job role taxonomy database with the extracted terms to identify one or more job roles in the unstructured job title record. For each job role identified in the unstructured job title record, the system extracts additional terms that appear prior to and after the identified job role in the unstructured job title record. For each additional term, the system maps the additional term to a standardized modifier by searching one or more of a job seniority taxonomy database, a job specialty taxonomy database, a job accreditation taxonomy database, and a job status taxonomy database, thereby identifying one or more of a job seniority modifier, a job specialty modifier, a job accreditation modifier, and a job status modifier for each additional term. The system then creates a multi-dimensional standardized job title for the member profile or job posting by writing the job role, the job seniority modifier, the job specialty modifier, the job accreditation modifier, and the job status modifier to a standardization record in a standardization database. The standardization record is associated with the member profile or the job posting.

Figure 1:
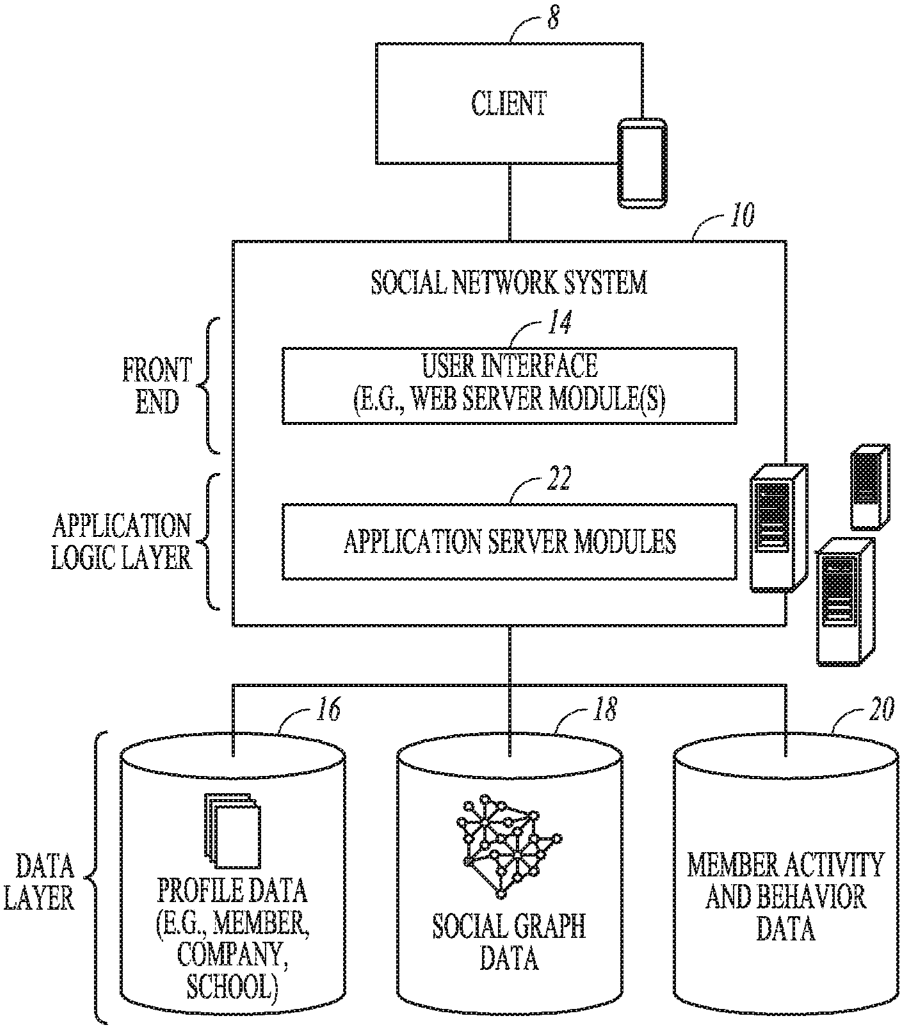
FIG. 1 is a block diagram of the functional modules or components that comprise a computer network-based online social networking system, including application server modules consistent with some embodiments of the invention.

FIG. 1 is a block diagram of the functional modules or components that comprise a computer-based or network-based online social networking service 10 consistent with some embodiments of the invention. As shown in FIG. 1, the online social networking service 10 is generally based on a three-tiered architecture, comprising a front-end layer, application logic layer, and data layer, and can communicate with a client device 8. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the present subject matter with unnecessary details, various functional modules and engines that are not germane to conveying an understanding of the present subject matter have been omitted from FIG. 1. However, a skilled artisan will readily recognize that various additional functional modules and engines may be used with an online social networking service, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the present subject matter is by no means limited to such architecture.

As shown in FIG. 1, the front end comprises a user interface module (e.g., a web server) 14, which receives requests from various client-computing devices, and communicates appropriate responses to the requesting client devices. For example, the user interface module(s) 14 may receive requests in the form of Hypertext Transport Protocol (HTTP) requests, or other web-based, application programming interface (API) requests. The client devices may be executing conventional web browser applications, or applications that have been developed for a specific platform to include any of a wide variety of mobile devices and operating systems.

As shown in FIG. 1, the data layer includes several databases, including one or more databases 16 for storing data relating to various entities represented in a social graph. With some embodiments, these entities include members, companies, and/or educational institutions, among possible others. Consistent with some embodiments, when a person initially registers to become a member of the online social networking service, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's profile, for example, in the database with reference number 16. With some embodiments, a member's profile data will include not only the explicitly provided data, but also any number of derived or computed member profile attributes and/or characteristics.

Once registered, a member may invite other members, or be invited by other members, to connect via the online social networking service. A "connection" may require a bi-lateral agreement by the members, such that both members acknowledge the establishment of the connection. The degree of connectivity refers to the amount or number of connections that exist for a particular person and/or the amount or number of connections among a group of persons. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data maintained in a database 18. With some embodiments a social graph data structure may be implemented with a graph database 18, which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph, and as such, various other databases may be used to store data corresponding with other entities. For example, although not shown in FIG. 1, consistent with some embodiments, the system may include additional databases for storing information relating to a wide variety of entities, such as information concerning various online or offline groups, job listings or postings, photographs, audio or video files, and so forth.

With some embodiments, the online social networking service may include one or more activity and/or event tracking modules, which generally detect various user-related activities and/or events, and then store information relating to those activities/events in the database with reference number 20. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

The application logic layer includes various application server modules 22, which, in conjunction with the user interface module(s) 14, generate various user interfaces (e.g., web pages) with data retrieved from various data sources in the data layer. With some embodiments, individual application server modules 22 are used to implement the functionality associated with various applications, services and features of the online social networking service. For instance, a messaging application, such as an email application, an instant messaging application, or some hybrid or variation of the two, may be implemented with one or more application server modules 22. Of course, other applications or services may be separately embodied in their own application server modules 22.

The online social networking service may provide a broad range of applications and services that allow members the opportunity to share and receive information, often customized to the interests of the member. For example, with some embodiments, the online social networking service may include a photo sharing application that allows members to upload and share photos with other members. As such, at least with some embodiments, a photograph may be a property or entity included within a social graph. With some embodiments, members of an online social networking service may be able to self-organize into groups, or interest groups, organized around a subject matter or topic of interest. Accordingly, the data for a group may be stored in a database. When a member joins a group, his or her membership in the group will be reflected in the social graph data stored in the database with reference number 18. With some embodiments, members may subscribe to or join groups affiliated with one or more companies. For instance, with some embodiments, members of the online social networking service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modeled with the social graph data of the database with reference number 18.

Figure 2:
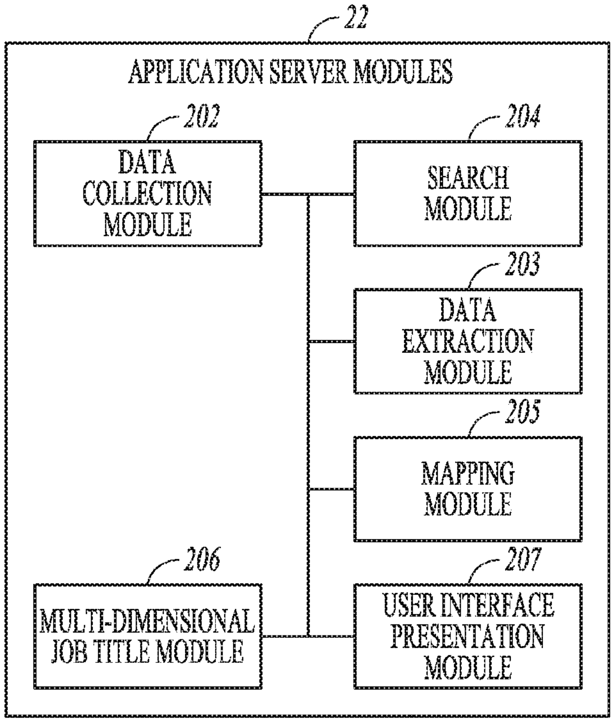
FIG. 2 is a block diagram depicting some example application server modules of FIG. 1.

FIG. 2 is a block diagram depicting some example application server modules 22 of FIG. 1. A data collection module 202 may be configured to collect, for example, unstructured job title records from the profile of a member of an online social network system or from a job posting on the online social networking system. Other data that can be collected by the data collection module 202 include other profile data, behavior data, endorsement data, online social networking service data, occupation data, and connectivity data. A data extraction module 203 extracts terms from the unstructured job title record, and further extracts additional terms that appear prior to and after the identified job role in the unstructured job title record. A search module 204 searches a job role taxonomy database with the extracted terms to identify job roles in the unstructured job title record. A mapping module 205 maps the additional terms to a standardized modifier by searching one or more of a job seniority taxonomy database, a job specialty taxonomy database, a job accreditation taxonomy database, and a job status taxonomy database, thereby identifying one or more of a job seniority modifier, a job specialty modifier, a job accreditation modifier, and a job status modifier for each additional term. The searching of these databases is performed by the search module 204. A multidimensional job title module 206 creates a multi-dimensional standardized job title for the member profile or job posting by writing the job role, the job seniority modifier, the job specialty modifier, the job accreditation modifier, and the job status modifier to a standardization record in a standardization database. A user interface presentation module 207 generates a user interface for presentation to the user. The user interface may include information pertaining to the multi-dimensional job title record created by the multi-dimensional job title module 206.

In an online social networking system as depicted in FIGS. 1 and 2, comprehensive and accurate job title data is one of the pillars of an economic graph, and can be important to an online social network system achieving a goal of creating economic opportunity for every member of the global workforce. An economic graph is a feature of an online social network system that digitally maps the global economy to connect talent with opportunity on a massive scale. An online social network system's ability to map both members and jobs to titles at scale can drive unique targeting and search capabilities, thereby allowing marketers, sales professionals, and recruiters to find their target audience by title, seniority and other dimensions as well. By creating rich, accurate and comprehensive mapping of members and jobs to titles, the online social networking system can create an ultimate data source for titles information and ensure that its products provide the best in class title data-based targeting capabilities.

In short, in an embodiment, a goal is to identify the correct title identifications given a raw member title on a member profile position or given a raw title on a job posting, and then to expand that raw title into a multi-dimensional logical record. A member profile position can be stored in an online social networking system under an "Experience" record or object on a member profile of the online social networking system. The overall idea of mapping members to titles, and in particular multi-dimensional titles, is based on an accepted definition of a title, that is, the least granular standardized representation that best captures the meaning of the original or raw member position or a job title. Based on the above definition of the problem, mapping both members and jobs to a multi-dimensional title means finding all the title entities in a title taxonomy that were mentioned in the raw title of the member profile or job posting. For example, if the raw title was "sr. swe," a standardized title could be "senior software engineer."

A title in the taxonomy is defined as a monolithic unit (that is, not multi-dimensional) that describes one's profession. In prior online social networking systems, a titles taxonomy attempted to capture all the possible professions in the world, based on its member's data. Some taxonomy entity examples include system analyst, senior system analyst, team lead, art director, asset protection specialist, and senior financial analyst.

Also in prior title taxonomies in online social network systems, there is a problem with synonyms. For example, the taxonomy can contain both "software developer" and "software engineer," each having a different identification (such as a numeric identifier that is used for many purposes in the online social networking system), even though both of these titles have the same responsibilities in a company and mean the same thing. Also, in an online social networking system, because members input their own titles and employers create their own job postings, a title taxonomy may have entries in it that are not titles that describe job responsibilities, such as "full time." Additionally, many entries are skills or non-informative titles such as "consultant." There may also be inconsistency among different titles in a taxonomy, such as there may be "senior software engineer," "software engineer," and "data scientist" in the taxonomy, but not "senior data scientist."

Because prior taxonomies in an online social networking system capture a monolithic view of a job position, only an exhaustive representation of every possible position in the world would result in being able to identify the essence of each and every raw title, without losing information. As such a task is not possible, whenever the raw title is not part of the taxonomy on an online social networking system. Consequently, a not insubstantial amount of information is lost. For example, the taxonomy in the online social networking system may have "java software engineer", but it probably won't have "scala software engineer." Thus, when mapping the raw title of"scala software engineer," the "scala" descriptor would be lost. As another example, the taxonomy may have "machine learning engineer," but it probably won't have "freelance machine learning engineer." Thus, when mapping this raw title, the "freelance" modifier would be lost. As another example, the taxonomy may have "machine learning engineer," but it probably won't have "machine learning professor." Thus, when mapping this raw title, the specialty of "professor" would be lost.

Also, an online social network service may consist of many departments, and some departments may be clients of other departments. For some clients, the seniority part of a job title may not matter. For other clients, the specific skills may not matter. For others, the employment relationship may not matter. Thus, when all the semantic information lies in one taxonomy and cannot be exposed and extracted, the different clients don't have the ability to choose how they use these data. Such clients should have better control over their input.

In an embodiment, a raw title refers to a string representing one or more positions. A position refers to a representation of one responsibility of a person in a company. A title is an internal representation of a position in a taxonomy. A seniority modifier modifies the title, and helps identify different degrees of experience for different persons who have the same job title.

It is possible that a raw title would describe several positions, such as "director of marketing and sales." In this example, the raw title describes two different responsibilities, and thus, two different positions—"director of marketing" and "director of sales." In this case, when a raw title is used to read a standardized taxonomy, two different titles should be returned, each representing a different position. When there is more than one position in a raw title, it can be assumed the titles are equivalent in the sense that this person holds both positions within the company. This does not mean however that two standardized titles would have the same score (relating to confidence in the retrieved standardized title), but rather it means that one cannot be preferred one over the other. Using a confidence score would allow clients to select which of the standardized titles they want to use.

Figure 3:
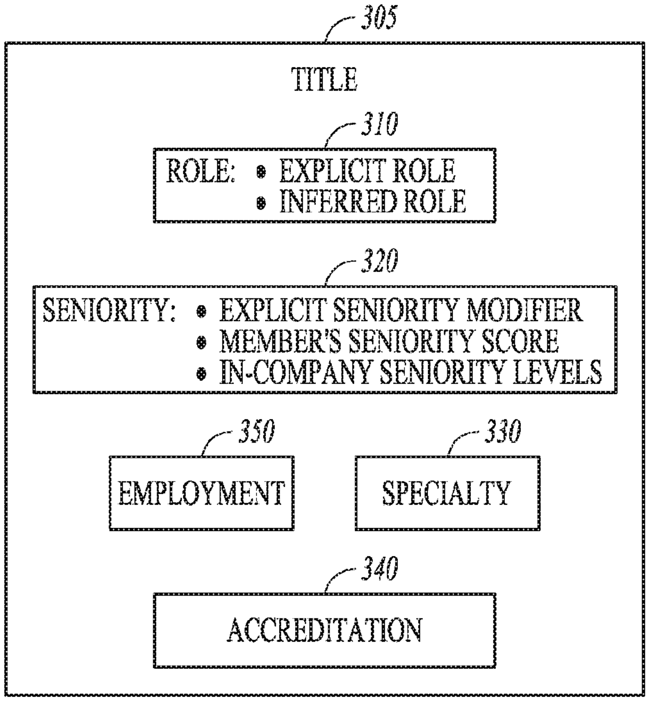
FIG. 3 illustrates an example description of an output from a job role standardization module.

Given the above problems, a different definition for the job title than that which has been used in prior online social networking systems is selected. This job title definition is graphically illustrated in FIG. 3. Specifically, a title 305 represents all the aspects needed in order to understand what a person is doing in a particular job position given the member's information, or what a person should do, given a job posting. These semantic aspects contain the following. A role 310, which is the essence of what a person is doing. It also often reveals information about the member's seniority or domain knowledge, for example, "software engineer," "VP of finance," or "registered nurse." The seniority 320 is the level of responsibility of a person, and as noted serves to permit one to differentiate two or more persons who may have the same job title. The specialty 330 includes information about an explicit skill or domain information that was not captured in the role 310, such as "java software engineer" or "cardiovascular surgeon." The accreditation 340 is the type of accreditation for this position, such as "registered" or "certified." The employment status 350 is the employment relationship between the position and the company, such as full time or contractor. The role 310 is the core of the title and all the other dimensions add information in order to better understand the position. In an embodiment, each dimension has its own taxonomy and the combination of all the different dimensions provides the complete understanding of what this position is all about. As per the above definition, the title is not a monolithic entity, but rather a composition of several dimensions that describes one position.

Figure 3A:
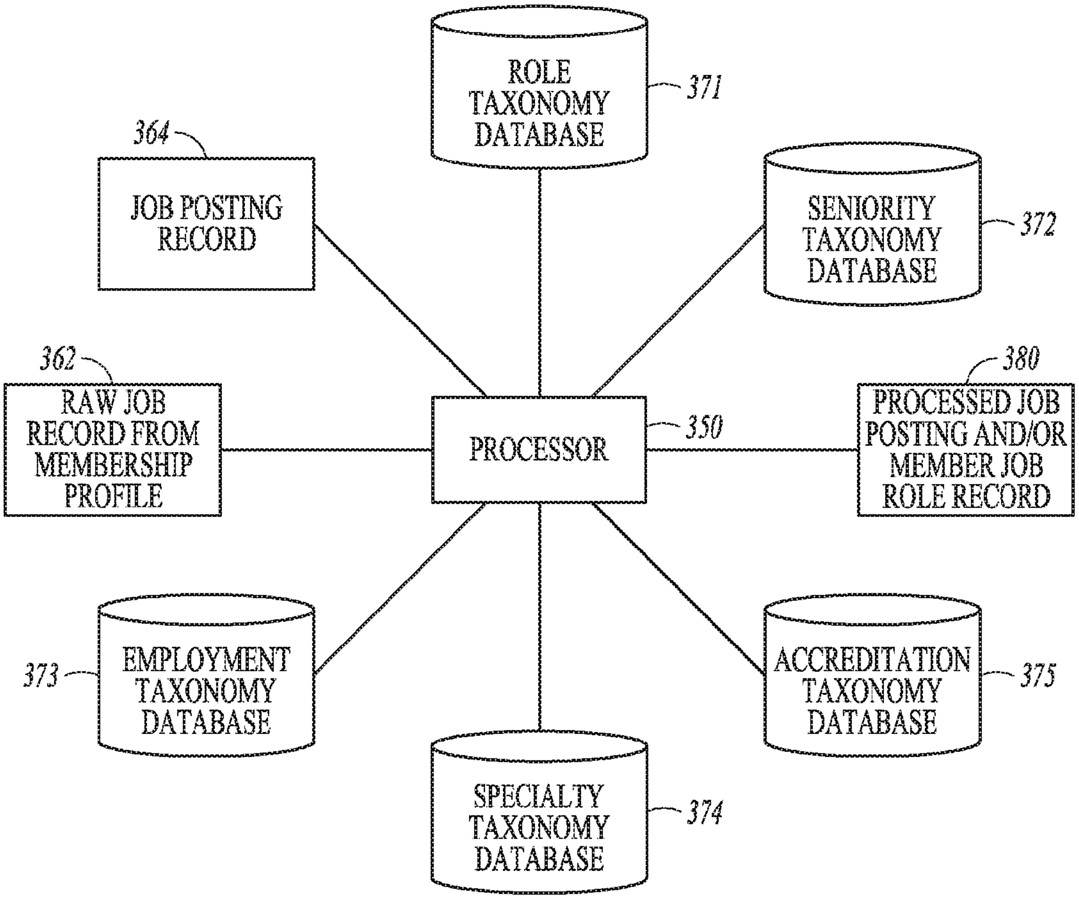
FIG. 3A is a block diagram of a system that creates a multi-dimensional job title logical model in an online social networking system.

FIG. 3A is a block diagram of a system that derives a multi-dimensional job title logical structure in an online social networking system. A processor 350 reads in an unstructured raw job record from either a member profile 362 or a job posting record 364. The processor processes the raw job record, and uses one or more of the role taxonomy database 371, the seniority taxonomy database 372, the employment taxonomy database 373, the specialty taxonomy database 374, and the accreditation taxonomy database 375 to extract or create at 380 different dimensions for the job title or role.

A title's dimensions are an internal representation of the different aspects of the title mentioned above in connection with FIG. 3. These dimensions may hold more information about these aspects, such as "inferred" versus "explicit." Some of these dimensions are mandatory (such as role and title seniority) and the others are optional and describe aspects that were not explicitly mentioned in the role. Since a multi-dimensional taxonomy is manually created and holds an important domain knowledge and business decisions, an online social networking system should always try to respect the taxonomy and not alter it. This means that if a title is found in the roles taxonomy, the online social networking system should not try to break it into different dimensions, as an assumption can be made that all the relevant information already exists in the role and that it is important enough to be a role by itself. If it wasn't, it should not have been added to the taxonomy in the first place. The logic behind this is that the main dimension uses it to compare two different positions in the role. If a specific role is part of the taxonomy, it means it has a different semantics or an important business logic, different than any other entity in the taxonomy. For example, if the raw title is "registered nurse" and "registered nurse" is a role in the taxonomy, the accreditation part in the taxonomy will be null, as it does not add any information to the role. If the role is "certified software engineer", and "certified software engineer" is not an entire title as a role in the roles taxonomy, then "certified" is an additional piece of information and would be returned in the accreditation field.

The job role is the core part of the title and it represents a concrete semantic meaning. The role defines the essence of the job and can be used in the phrase "I work as a . . . " However, sometimes the role is not enough to fully understand what the person is doing, as the role may be too vague. The role is a descriptor for a person rather than a skill or domain (e.g., software engineer, not software engineering; salesperson, not sales). Combined with the other dimensions, the role's meaning can be enriched and there can be a concrete understanding of the position.

One should be able to determine, for each role, how vague it is. Thus, if the raw title is "manager", it would be standardized or taxonomized to "manager," and it would be noted that this is highly vague. The title classifier attempts to further disambiguate such roles, and infers an implicit, non-vague role, based on a member's or a job's context. The vagueness of a role can be defined using the entropy of the distribution of more granular titles under it. The number of other title identifications are sub-identifications of this identification. In an embodiment, the vagueness of a role can be marked as binary, that is, 1 if it is vague and 0 if not vague. In another embodiment, vagueness can be automatically inferred via an analysis (regression analysis for example) of members, skills, industries, and descriptions that are associated with the job title.

In an embodiment, whenever the role is not a leaf in the job role taxonomy, an attempt is made to better infer a more specific role. For example, if the raw title is "engineer," the explicit role would be "engineer" and the inferred role (based on any available context information such as proficiency in software languages) may be "software engineer." If the raw title was "software engineer," the role would be "software engineer" and the inferred role would be null.

Seniority data contains both explicit data that can be extracted directly from the job title and a list of inferred fields that require some external information. For an explicit seniority there is a seniority modifier present in the job title. That is, an identification that is directly determined from the seniority modifiers in the title. This value is a modifier over the level of seniority of the role, and it is used to understand the distance from this person's position to the average person with the base job role. This is a normalization of all the different modifiers, that is, a mapping from a modifier string to a seniority modifier taxonomy. For example, both "senior," "sr.," and "lead" may have the same identification and "partner" and "associate" may have another identification. The seniority modifier is only an additional piece of information to the role and it exists only when it changes the seniority level of the role itself. Having such a modifier enables one to break down the title seniority and to determine how much time it takes to attain the seniority token "senior" as a software engineer, and what fraction of seniors make it to staff in the tech industry. For example, if the job title is "Senior Data Scientist," the role would be "Data Scientist" and the seniority modifier would be "senior." If the job title is "Data Scientist," then the role is "Data Scientist" and the seniority modifier would be null. If the job title is "Senior VP of finance," the role is "VP of finance" and the seniority modifier is "senior." If the job title is "VP of finance," then the role is "VP of finance" and the seniority modifier is null.

In an embodiment, the seniority can be inferred. For example, if a raw job title includes "software engineer," but there is no seniority modifier associated with this role, a senior modifier could be inferred from the number of years that a person has been a software engineer (as determined from the person's profile), or the number of years of experience required by a job posting.

In-company seniority levels are a set of categories that defines the level of responsibilities of a person within a company. This information is derived from the job title, but cannot be achieved as a simple dictionary lookup, as it may involve external information, such as the particular company and the particular industry. These categories would enable one to determine persons who are at the VP level and above in a company, to determine the distribution of seniorities of individual contributors (ICs) in a company, and to determine to what companies an entry level person from a particular company usually transfers. As is known to those of skill in the art, there are normally two seniority tracks within a company—management and individual contributors.

The seniority level taxonomy is a categorical taxonomy that describes different levels of responsibilities in a company. It is simple and straightforward and has different categories for IC and management. For example, categories can include internship, entry level, experienced IC, advanced IC, lower middle management, upper middle management, and executives.

A member's seniority score enables a comparison of the level of responsibilities of two members. For example, the CEO of a small start-up versus the CEO of a large multinational corporation. They both share the same seniority level within their company, that is CEO, but their "general seniority" is completely different. The seniority score therefore allows a comparison between an "associate professor at Stanford" and a "principal software engineer at a large Internet company" by using features like company size, education, industry, etc. For example, a CEO from an Internet company having more than 1,000 employees may be assigned a seniority score of 0.8, while a CEO of an Internet company with less than 20 employees may be assigned a value of 0.5. The values of 0.8 and 0.5 then permit the direct comparison of these two CEOs.

In an embodiment, a specialty field is a list of skills or domains that were explicitly mentioned in the job title. This list is used in the context of the position, and it is used to better disambiguate different roles. For example, there may be "java software engineer," "software developer—algorithms," or "machine learning engineer." In all of these three cases, the role was the same, as in this context, "software engineer," "software developer," and "engineer" represent the same role, but each one of those positions requires a different set of skills, represented here by "java," "algorithms," and "machine learning." One could argue that "software" can also be a skill and "engineer" is the role. While this is true, the granularity of roles is defined by the taxonomy. If"software engineer" is part of the title taxonomy, then no attempt is made to break it into different dimensions. If it was decided to add "algorithms software engineer" to the title taxonomy, then there would be no attempt to break it up either. In this case, the title taxonomy is hierarchical and is known that "algorithms software engineer" is a "software engineer." If the specialty is missing, the inferred skills can still be used to understand the type of role. For example, if someone says "I am a software engineer", one still may want to determine what kind of software engineer that person is, based on the skill or skill cluster.

An accreditation list represents the level of the person's or job position's certification, when it is explicit in the title string. Some possible options may be "apprentice," "certified," etc.

An employment status list represents the employment relationship between this member and the company. Some possible options may be "contractor," "full time," etc.

Based on the foregoing, if a raw job title is "Senior VP of finance," the role would be "VP of finance," the explicit seniority would be "Senior," and the specialty, accreditation, and employment status would be "null." As another example, if the raw job title is "part time registered java developer," the role would be "software engineer," the title seniority would be "IC," the explicit seniority would be "null," the specialty would be "java," the accreditation would be "registered," and the employment status would be "part time."

Regarding the dimensional taxonomies, each dimension has its own taxonomy. In an embodiment, the more complex taxonomies (i.e., roles, skills, and domains) are hierarchical, with a vagueness level specified for each entry. When a taxonomy is hierarchical, then if an entity A is added that differs from an entity B by its domain, then one should be able to say that "A is a B". For example, the taxonomy may include the two following roles: "software engineer" and "engineer". When "java software engineer" is classified it would be mapped to a role of "software engineer" and a skill of "java." When "sanitation engineer," is classified, it would be mapped to a role of "engineer" and a specialty of "sanitation." Although in both cases the entire essence of the raw title was captured, clients should have the ability to understand that the role of "engineer" is more vague, without traversing the taxonomy.

In an embodiment, the roles taxonomy does not have different ids for synonyms. The taxonomy holds all synonym information and the classifier maps each of those to the same title id. The taxonomy also holds some of the external information for the more common positions, even if the complete position is not part of the roles taxonomy. For example, if "java developer" occurs frequently enough, but it is still not desired that it be added to the roles taxonomy, the taxonomy should taxonomize "java developer" into a role of "software engineer" and a skill of "java." This can be used for presentation purposes, such as a type-ahead feature. Each taxonomy can be language agnostic and each entity can represent the same concepts in different languages.

As noted above, a raw title may describe a list of positions. There are a plurality of scoring options that can be considered. There can be any combinations of the following—score per field (i.e., how certain that the essence of the raw title was captured using the field selected from the role taxonomy), score per field (i.e., how certain that the essence of the specific position was captured using the field selected from the role taxonomy), score per position (i.e., how certain that the essence of the position as a whole was captured using the field selected from the taxonomy), and the score per raw title (i.e., how certain that the essence of all the positions for this raw title was captured using the field selected from the taxonomy).

Figure 4A:
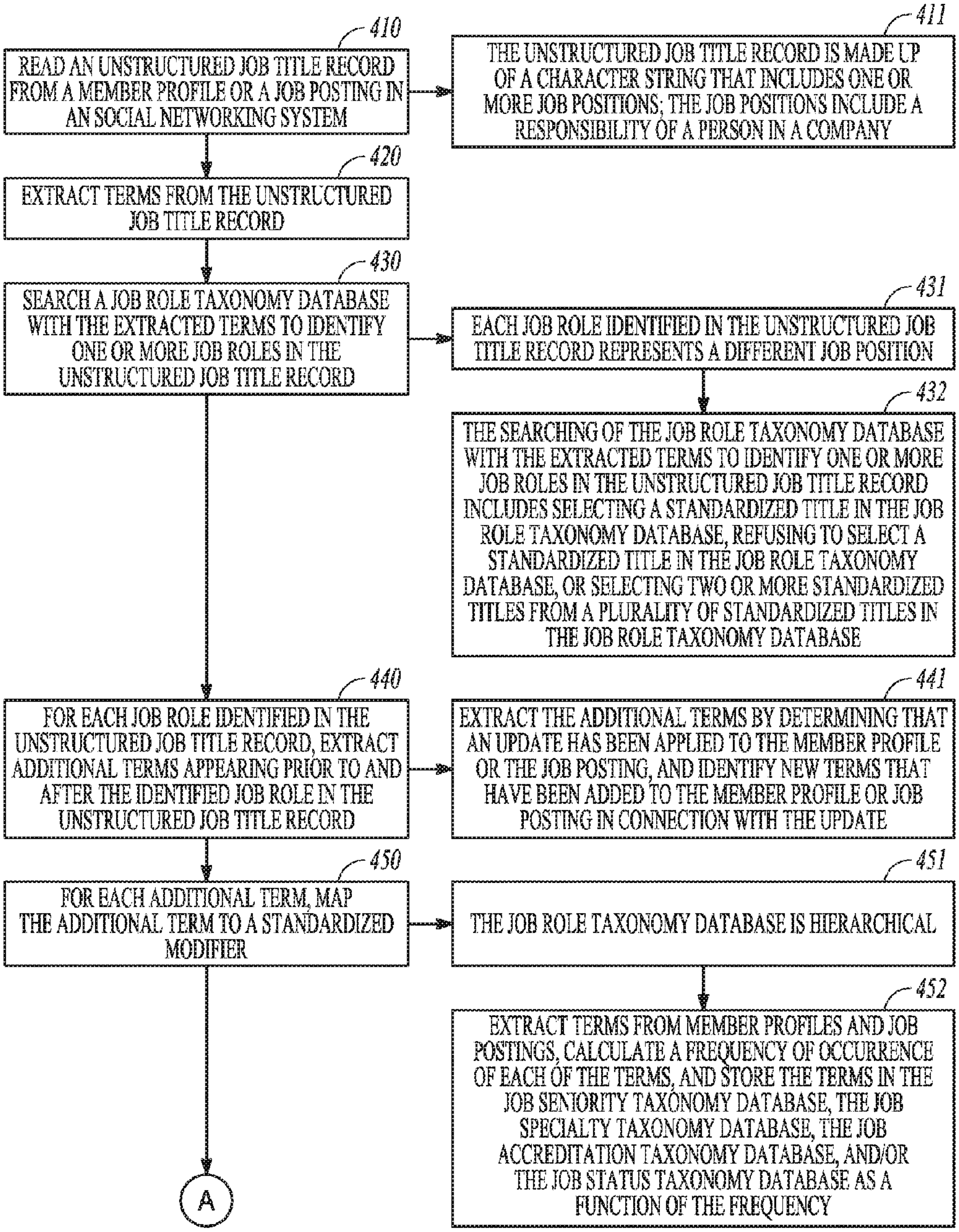
FIGS. 4A and 4B are a flow diagram of an example embodiment of a process to create a multi-dimensional job title logical model in an online social networking system.
Figure 4B:
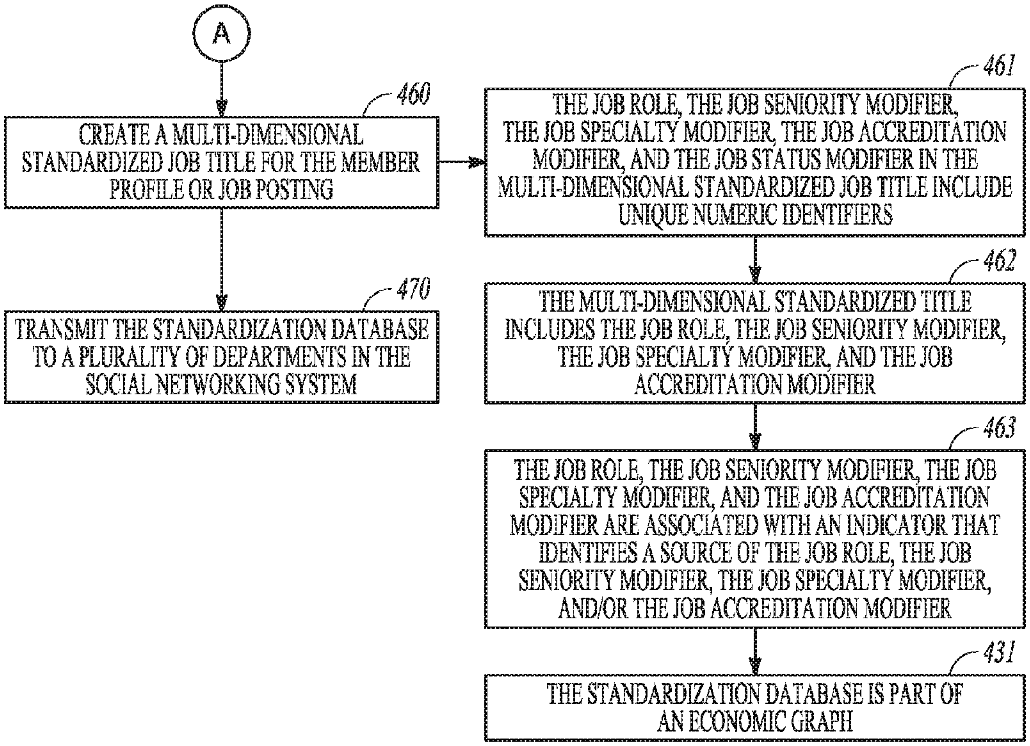

FIGS. 4A-4B are a flow diagram illustrating an example method of creating a multi-dimensional job title logical record for member of an online social networking system. In various embodiments, the method may be implemented by one or more of the modules of FIG. 2. FIGS. 4A-4B include a number of process blocks 410-470. Though arranged somewhat serially in the example of FIGS. 4A-4B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 4A and 4B, at 410, an online social networking system reads an unstructured job title record from a member profile or a job posting in the social networking system. As noted above, in an online social networking system, each member has a profile that includes professional, educational, and personal information about the member. An online social networking system can also include a database of available jobs that can be searched by the members. The unstructured job title record includes the title, position, or role of the job, and further descriptive details about the job. As indicated at 411, the unstructured job title record is made up of a character string that includes one or more job positions, and that the job positions include a responsibility of a person in a company. As noted above, in a member profile, the job role describes what a person does, and in a job posting, it describes what a person in such a job is expected to do. That is, the job position or role includes a responsibility of a person in a company. The company in the unstructured job title record is either the company that the member has worked for or is presently working for, or the identification of the company that is seeking to fill the open job position in the job posting. In an embodiment, terms in the unstructured job title record are extracted from the record, and then used to key into the role taxonomy to determine if such term or terms are a job role. Both exact match searching/comparisons and approximate fuzzy searching/comparisons can be executed. Any matches, either exact or approximate, can then be identified as a job role in the unstructured job title record. For non-exact matches, a confidence level can be calculated that indicates the level of confidence that the approximate match identifies the actual job role from the unstructured job title record.

At 420, the online social networking system extracts terms from the unstructured job title record, and at 430, the system searches a job role taxonomy database with the extracted terms to identify one or more job roles in the unstructured job title record. As indicated at 431, each job role identified in the unstructured job title record represents a different job position. At 432, the searching of the job role taxonomy database with the extracted terms to identify one or more job roles in the unstructured job title record includes selecting a standardized title in the job role taxonomy database (because the extracted term matches or nearly matches a standardized job role), refusing to select a standardized title in the job role taxonomy database (because the extracted term does not match any standardized job roles), or selecting two or more standardized titles from a plurality of standardized titles in the job role taxonomy database (because more than one standardized job role matches the extracted term).

At 440, for each job role identified in the unstructured job title record, the online social networking system extracts a plurality of additional terms appearing prior to and after the identified job role in the unstructured job title record. Such terms appearing prior to and after the job role could be a modifier of the job role. In an embodiment, at 441, the online social networking system extracts the additional terms by determining that an update has been applied to the member profile or the job posting, and then identifies new terms that have been added to the member profile or job posting in connection with the update.

Thereafter, at 450, for each additional term, the online social networking system maps the additional term to a standardized modifier. The online social networking system implements this mapping by searching a job seniority taxonomy database, a job specialty taxonomy database, a job accreditation taxonomy database, and/or a job status taxonomy database. The searching of these databases identifies a job seniority modifier, a job specialty modifier, a job accreditation modifier, and/or a job status modifier for each additional term. If no matches or near matches are found, then the additional term may not be a valid modifier. As indicated at 451, the job role taxonomy database is hierarchical. That is for example, it is known that an "algorithms software engineer" is a "software engineer, and the hierarchical structure of the database reflects this. Additionally, as indicated at 452, in an embodiment, to create these taxonomies, the online social networking system extracts a plurality of terms from a plurality of member profiles and job postings, calculates a frequency of occurrence of each of the plurality of terms, and stores one or more of the plurality of terms in one or more of the job seniority taxonomy database, the job specialty taxonomy database, the job accreditation taxonomy database, and the job status taxonomy database as a function of the frequency. This functionality helps assure that the online social networking system only stores valid terms in the taxonomy databases. The online social networking system verifies and normalizes the seniority modifiers by mapping the seniority modifiers to a modifier taxonomy database. In an embodiment, the seniority modifier taxonomy database is created and maintained by identifying terms that commonly appear in members' profiles and in job postings, examining the most frequently appearing terms, and storing the ones that can be identified as seniority modifiers in the seniority modifier database taxonomy.

Regarding the seniority modifier, an additional seniority modifier can be inferred by the online social networking system using the unstructured job title record and information external to the unstructured job title record. For example, a member profile or a job posting may not have or use the seniority modifier "senior" in connection with a particular job role. However, there may be an indication that the member has so many years of experience or that a particular job posting requires so many years of experience from its job applicants. The online social networking system can then check external resources to determine if there is any particular seniority modifier associated with that many years of experience in that particular job, or company, or industry.

The online social networking system uses an inference model to determine the seniority modifier based on data in the unstructured record. For example, a prediction module can be configured to access data associated with members having particular seniority modifiers, and then to classify the data as signature data. Moreover, the prediction module can be configured to perform prediction modeling based on the signature data and a prediction model (e.g., a logistic regression model), in order to identify seniority modifiers in the unstructured record that are associated with data matching the signature data. Accordingly, the prediction module may identify seniority modifiers in an unstructured record.

At 460, the online social networking system creates a multi-dimensional standardized job title for the member profile or job posting. The online social networking system creates this multi-dimensional standardized job title by writing the job role, the job seniority modifier, the job specialty modifier, the job accreditation modifier, and/or the job status modifier to a standardization record in a standardization database. In an embodiment, the standardization record is associated with the member profile or the job posting. As noted at 461, the job role, the job seniority modifier, the job specialty modifier, the job accreditation modifier, and the job status modifier in the multi-dimensional standardized job title include unique numeric identifiers. These unique identifiers permit an exact means to identify each unique job role in the online social networking system. As noted at 462, the multi-dimensional standardized title includes the job role, which describes what a person does in a company. The multi-dimensional standardized title includes the job seniority modifier, which describes a level of responsibility that is defined by the job role. The multi-dimensional standardized title also includes a job specialty modifier, which describes an explicit skill of the person (who is associated with the member profile) in the company. The multi-dimensional standardized title further includes a job accreditation modifier, which describes a certification of the person in the company. At 463, the job role, the job seniority modifier, the job specialty modifier, and the job accreditation modifier are associated with an indicator that identifies a source of the job role, the job seniority modifier, the job specialty modifier, and/or the job accreditation modifier. For example, the indicator can be an inferred indicator or an explicit indicator. If the job security modifier is associated with an explicit indicator, then the job security modifier was explicitly disclosed in the member profile or job posting. If the job security modifier is associated with an implicit indicator, then the job security modifier was inferred from the member profile or the job posting. For example, if the member's profile indicates that the member has been a software engineer for 20 years, then it can be inferred that the member is a senior software engineer. The optional indicator and mandatory indicator indicate whether an aspect of the job title record is mandatory or optional. In an embodiment, the job role is mandatory, and the job seniority modifier, the job specialty modifier, and the job accreditation modifier are optional. As indicated at 464, the standardization database is part of an economic graph. An economic graph is a feature of an online social networking system that digitally maps the global economy to connect talent with opportunity on a massive scale.

At 470, the online social networking system transmits the standardization database to a plurality of departments in the social networking system. The distribution of the standardization database to the many different departments of the online social networking system permits standardization of functions relating to job role processing among the plurality of departments. For example, a department that is primarily involved with searching functions on the online social networking system and another department that is primarily involved with maintaining a job posting bulletin board will both benefit if job roles and titles are standardized throughout the entire online social networking system. That is, searching through the job posting bulletin board will be more fruitful if both the searching functionality and the job posting functionality use the same job roles for the same types of jobs.

The multi-dimensional job title logical record disclosed herein is structurally different from and offers several advantages over an unstructured job title record normally found in a social networking system and other online systems. The multi-dimensional record has all aspects of a particular job role in one logical record, so that multiple databases do not have to be accessed in order to retrieve additional information relating to a particular job role. The standardized logical record, created from an unstructured record and also from other sources, also cohesively binds together the many different departments of an online social networking system. This also allows for more effective storage and faster searching, since the multi-dimensional record has a certain number of needed fields therein as compared to that of the unstructured, flat-file structure of the unstructured raw file record. Since the system creates this multi-dimensional record from raw unstructured input, users have more flexibility in entering data for personal profiles and/or job postings, since the online social networking system itself creates the standardized multi-dimensional record from whatever is present in the unstructured raw file record. In short, an embodiment is not simply directed to any form of storing job title data, but instead is specifically directed to a multi-dimensional job title logical record for an online social networking system.

Figure 5:
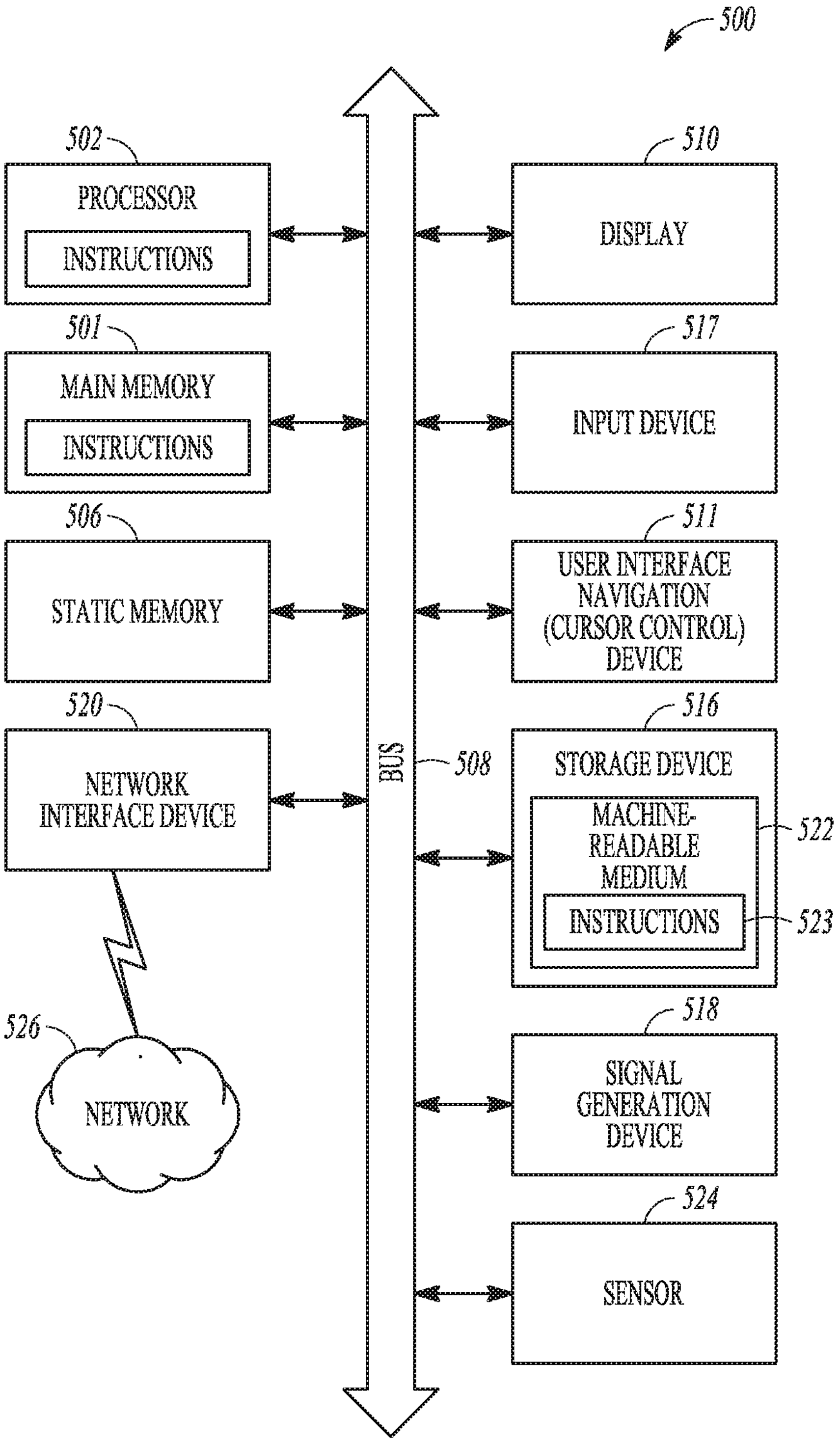
FIG. 5 is a block diagram of a machine in the form of a computing device within which a set of instructions, for causing the machine to perform any one or more of the methodologies discussed herein, may be executed.

FIG. 5 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 501 and a static memory 506, which communicate with each other via a bus 508. The computer system 500 may further include a display unit 510, an alphanumeric input device 517 (e.g., a keyboard), and a user interface (UI) navigation device 511 (e.g., a mouse). In one embodiment, the display, input device and cursor control device are a touch screen display. The computer system 500 may additionally include a storage device 516 (e.g., drive unit), a signal generation device 518 (e.g., a speaker), a network interface device 520, and one or more sensors 521, such as a global positioning system sensor, compass, accelerometer, or other sensor.

The drive unit 516 includes a machine-readable medium 522 on which is stored one or more sets of instructions and data structures (e.g., software 523) embodying or utilized by any one or more of the methodologies or functions described herein. The software 523 may also reside, completely or at least partially, within the main memory 501 and/or within the processor 502 during execution thereof by the computer system 500, the main memory 501 and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 523 may further be transmitted or received over a communications network 526 using a transmission medium via the network interface device 520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A social networking system comprising:
one or more processors; and
a computer readable medium storing instructions that, when executed by the one or more processors, cause the system to perform operations comprising:
receiving an unstructured job title record from a member profile or a job posting in the social networking system;
extracting terms from the unstructured job title record;
searching a job role taxonomy database with the extracted terms to identify one or more job roles in the unstructured job title record;
for a job role identified in the unstructured job title record, extracting a plurality of additional terms appearing prior to and after the identified job role in the unstructured job title record;
mapping each additional term of the plurality of additional terms to a standardized modifier by searching one or more of a job seniority taxonomy database, a job specialty taxonomy database, a job accreditation taxonomy database, and a job status taxonomy database, thereby identifying one or more of a job seniority modifier, a job specialty modifier, a job accreditation modifier, and a job status modifier for each additional term; and
creating a multi-dimensional standardized job title for the member profile or job posting by writing the job role identified in the unstructured job title record, the job seniority modifier, the job specialty modifier, the job accreditation modifier, and the job status modifier to a standardization record in a standardization database, the standardization record associated with the member profile or the job posting.

2. The social networking system of claim 1, wherein the multi-dimensional standardized title comprises the job role describing what a person does in a company, a job seniority modifier describing a level of responsibility defined by the job role, a job specialty modifier describing an explicit skill of the person in the company, and a job accreditation modifier describing a certification of the person in the company.

3. The social networking system of claim 2, wherein the job role, the job seniority modifier, the job specialty modifier, and the job accreditation modifier comprise an indicator identifying a source of the job role, the job seniority modifier, the job specialty modifier, and the job accreditation modifier and wherein the indicator comprises one or more of an inferred indicator, an explicit indicator, an optional indicator, and a mandatory indicator.

4. The system of claim 1, comprising transmitting the standardization database to a plurality of departments in the social networking system so as to permit standardization of functions relating to job role processing among the plurality of departments.

5. The system of claim 1, comprising extracting the plurality of additional terms by determining that an update has been applied to the member profile or the job posting, and identifying new terms that have been added to the member profile or job posting in connection with the update.

6. The system of claim 1, wherein the unstructured job title record comprises a character string comprising one or more job positions, and wherein the job positions comprise a responsibility of a person in a company.

7. The system of claim 1, wherein a dimension of the multi-dimensional standardized job title comprises an implicit-explicit indicator or a mandatory-optional indicator.

8. The system of claim 1, wherein the job role, the job seniority modifier, the job specialty modifier, the job accreditation modifier, and the job status modifier in the multi-dimensional standardized job title comprise unique numeric identifiers.

9. The system of claim 1, wherein the job role taxonomy database is hierarchical.

10. The system of claim 1, comprising extracting a plurality of terms from a plurality of member profiles and job postings, calculating a frequency of occurrence of the plurality of terms, and storing one or more of the plurality of terms in one or more of the job seniority taxonomy database, the job specialty taxonomy database, the job accreditation taxonomy database, and the job status taxonomy database as a function of the frequency.

11. The social networking system of claim 1, wherein each job role identified in the unstructured job title record represents a different job position.

12. The social networking system of claim 1, wherein the searching the job role taxonomy database with the extracted terms to identify one or more job roles in the unstructured job title record comprises selecting a standardized title in the job role taxonomy database, refusing to select a standardized title in the job role taxonomy database, or selecting one or more standardized titles from a plurality of standardized titles in the job role taxonomy database.

13. The social networking system of claim 1, wherein the standardization database is part of an economic graph.

14. A process comprising:

receiving into a computer processor in an online social networking system an unstructured job title record from a member profile or a job posting in the online social networking system;

extracting terms from the unstructured job title record;

searching a job role taxonomy database with the extracted terms to identify one or more job roles in the unstructured job title record;

for a job role identified in the unstructured job title record, extracting a plurality of additional terms appearing prior to and after the identified job role in the unstructured job title record;

mapping each additional term of the plurality of additional terms to a standardized modifier by searching one or more of a job seniority taxonomy database, a job specialty taxonomy database, a job accreditation taxonomy database, and a job status taxonomy database, thereby identifying one or more of a job seniority modifier, a job specialty modifier, a job accreditation modifier, and a job status modifier for each additional term; and creating a multi-dimensional standardized job title for the member profile or job posting by writing the job role identified in the unstructured job title record, the job seniority modifier, the job specialty modifier, the job accreditation modifier, and the job status modifier to a standardization record in a standardization database, the standardization record associated with the member profile or the job posting.

15. The method of claim 14, wherein the multi-dimensional standardized title comprises the job role describing what a person does in a company, a job seniority modifier describing a level of responsibility defined by the job role, a job specialty modifier describing an explicit skill of the person in the company, and a job accreditation modifier describing a certification of the person in the company.

16. The method of claim 15 wherein the job role, the job seniority modifier, the job specialty modifier, and the job accreditation modifier comprise an indicator identifying a source of the job role, the job seniority modifier, the job specialty modifier, and the job accreditation modifier and comprising one or more of an inferred indicator, an explicit indicator, an optional indicator, and a mandatory indicator.

17. The method of claim 14, comprising transmitting the standardization database to a plurality of departments in the online social networking system so as to permit standardization of functions relating to job role processing among the plurality of departments.

18. The method of claim 14, comprising extracting the plurality of additional terms by determining that an update has been applied to the member profile or the job posting, and identifying new terms that have been added to the member profile or job posting in connection with the update.

19. The method of claim 14, comprising extracting a plurality of terms from a plurality of member profiles and job postings, calculating a frequency of occurrence of the plurality of terms, and storing one or more of the plurality of terms in one or more of the job seniority taxonomy database, the job specialty taxonomy database, the job accreditation taxonomy database, and the job status taxonomy database as a function of the frequency.

20. The method of claim 14, wherein the searching the job role taxonomy database with the extracted terms to identify one or more job roles in the unstructured job title record comprises selecting a standardized title in the job role taxonomy database, refusing to select a standardized title in the job role taxonomy database, or selecting one or more standardized titles from a plurality of standardized titles in the job role taxonomy database.

* * * * *